United States Patent [19]

Niemi et al.

[11] 4,239,493
[45] Dec. 16, 1980

[54] METHOD AND APPARATUS FOR CONTROLLING THE PH

[75] Inventors: Antti J. Niemi, Kauniainen; Pentti K. Jutila, Helsinki, both of Finland

[73] Assignee: Pentti Jutila, Helsinki, Finland; a part interest

[21] Appl. No.: 913,471

[22] Filed: Jun. 7, 1978

[30] Foreign Application Priority Data

Jun. 7, 1977 [FI] Finland ............................. 771810

[51] Int. Cl.$^3$ ............................ G05B 13/02; G05D 21/02
[52] U.S. Cl. ............................ 23/230 A; 364/500; 422/62; 422/108
[58] Field of Search ............................ 422/75, 62, 108; 23/230 A; 324/30; 364/500

[56] References Cited

U.S. PATENT DOCUMENTS

| | | | |
|---|---|---|---|
| 3,791,793 | 2/1974 | Friedmann et al. | 23/230 A |
| 3,899,294 | 8/1975 | Magiros | 23/230 A |
| 4,053,743 | 10/1977 | Niemi | 23/230 A |

OTHER PUBLICATIONS

Shinskey, et al., "Adaptive Feedback Applied to Feedforward pH Control," 1970 Phila. ISA Conf., Preprint, pp. 565–570.
Wilson, H. S. et al., ISA Preprint 11. 1-2-64, 10/12/64.

*Primary Examiner*—R. E. Serwin
*Attorney, Agent, or Firm*—Holman & Stern

[57] ABSTRACT

The invention relates to a method and apparatus for controlling the pH in a continuous flow vessel into which process material is fed through a feed channel and controlling chemical solution is fed through a control channel and in which the pH is measured at an output part of the vessel in order to effect the control by controlling the control chemical feed according to the feedback method, the value of a reference variable being given by a pH number. According to the invention the result of the pH measurement as well as the reference value are transformed to the hydrogen ion concentration or to another concentration quantity unambiguously depending on said hydrogen ion concentration, a final feedback quantity is determined by means of an equation describing dissociation equilibria in the solution, said feedback quantity being a function of the concentration quantity derived from the pH measurement and eventually a function of an independent concentration quantity derived from an other measurement at the vessel output, a final reference value is determined by means of said equation, said final reference value being a function of the concentration quantity derived from the initial reference value, and, eventually, a function of the independent concentration quantity mentioned, a control deviation is formed as the difference between said final reference value and said final feedback quantity, and, finally the feed of the controlling chemical is controlled on the basis of said control deviation, typically using a linear controller and an actuator controlled thereby.

5 Claims, 1 Drawing Figure

METHOD AND APPARATUS FOR CONTROLLING THE PH

BACKGROUND OF THE INVENTION

1. Field of the Invention

This invention relates to a method for controlling pH in a continuous flow vessel which is entered by a process material through a feed channel and by controlling chemical solution through a control channel and in which the pH is measured at the output part of the vessel in order to effect the control by controlling the feed of the control chemical by the feedback method, the value of a reference variable being given and expressed by a pH number. The invention also concerns an apparatus for carrying out such method.

2. Description of the Prior Art

The control of acidity belongs to the most common control tasks in industry, acquisition of water and treatment of waste liquids. For its normal ways of realization, it is comparable with the control of other common process variables. pH which is a quantity descriptive of the acidity is measured by a pH meter or transmitter, and the output signal from this is brought immediately to the comparator of the controller which provides the control for the feed of the controlling chemical to the feed channel or to later point of the process. The difficulties appearing in the pH control are, however, greater than those in the control of other process variables. As reasons for this are mentioned i.a. nonlinearity present in the control loop and high sensitivity of the process.

As a physical phenomenon, the acidity or pH of a water solution is determined by the concentrations of the dissolved chemicals. In the case of pure liquids the dissociation equilibrium is reached fast and the state of the process can be expressed by means of algebraic equilibrium equations by which the hydrogen ion concentration or acidity can be unambiguously determined.

In order to set up the dynamic model, the above equilibrium model has to be added to the dynamic flow model of the process. Starting from the known, simple model of the continuous flow ideal mixer either as such or combined with a plug flow such reactor model has been set up and, using it, the feedback control simulated (Richter & al., Instrumentation Technology, 21, No. 4, p. 35-40, 1974), optimal control (McAvoy, Ind., & Eng. Chem., Process Des. & Develop., 11, No. 1, p. 71-78, 1972) and stability studied (Orava & Niemi, Int. of Control, 20, No. 4, p. 557-567, 1974. Rang, Advances in Instrumentation, 30, Part 3, p. 764/1-4, 1975).

Conclusions on how models based on the thermodynamic equilibrium can be applied to the practical pH control, have not been brought to the level of an industrial exploitation; i.e. up to now no clear suggestion has been made on such feedback control loop for pH which using actions based on models would yield a better result than the pH control by conventional, previously known methods.

ph process.

While the model of the hydrogen ion concentration is formulated, the liquid is assumed homogeneous and the appearing dissociation processes fast and reversible. These assumptions are valid both for strong or fully dissociating and weak or partly dissociating acids and bases. The acidity under these conditions has been treated thoroughly i.a. in the U.S. Pat. No. 4,053,743 granted to A. Niemi. The equilibrium dependences of the dissociation processes can also be combined in one algebraic equation shown below (Rang, loc. cit.). The activities have been substituted here by the concentrations and the coefficients $K_{aj}$ and $K_{bi}$ describe the dissociation of weak acids and bases. $K_w$ is the ion product of water at 25° C.

$$C^+ - \frac{K_w}{C^+} + C_B - C_A + \sum_{i=1}^{n} \frac{K_{bi}C_{\beta i}C^+}{K_w + K_{bi}C^+} - \sum_{j=1}^{m} \frac{K_{aj}C_{\alpha j}}{K_{aj} + C^+} = 0 \quad (1)$$

$$K_w = C^+C^- \approx 10^{-14} (\text{mole/liter})^2 \quad (2)$$

$$K_{aj} = \frac{C^+C_{aj}^-}{C_{aj}} \quad K_{bi} = \frac{C^-C_{bi}^+}{C_{bi}} \quad (3)$$

$$C_{\alpha j} = C_{aj} + C_{aj}^- \quad C_{\beta i} = C_{bi} + C_{bi}^+$$

$C^+$ concentration of $H^+$ ion
$C^-$ concentration of $OH^-$ ion
$C_A$ concentration of strong acid
$C_B$ concentration of strong base
$C_\alpha$ concentration of weak acid
$C_\beta$ concentration of weak base
$C_a$ concentration of undissociated acid
$C_b$ concentration of undissociated base
$C_a^-$ concentration of weak anion
$C_b^+$ concentration of weak cation The two first terms of the equation (1) express the difference of the concentrations of the hydrogen and hydroxyl ions. If only strong acids are present, this quantity depends linearly and unambiguously on the concentration difference of the strong acids and bases present.

Since the process of mixing of homogeneous solutions is linear with regard to the concentration, the total process is linear also with regard to such chemicals for which the dissociation may be left inconsidered at the determination of their concentrations. The concentration, at the process output, of a chemical fed to the process, can then be determined in the general case by means of the convolution integral, if the weighting function of the process is known which in this case is identical with the residence time distribution. If e.g. a process solution containing a weak acid (weighting function $g_o$) and a control solution containing a strong base, through the control channel, (weighting function $g_1$) are fed to a continuous flow vessel, the following process model is obtained for their total concentrations:

$$C_\alpha(t) = \int_{-\infty}^{t} C_{\alpha o}(\theta) g_o(t - \theta) d\theta \quad C_B(t) = \int_{-\infty}^{t} C_{B1}(\theta) g_1(t - \theta) d\theta \quad (4)$$

0, 1 as subindices refer to process feed flow and control flow, respectively.

The dependence of the concentration of the hydrogen ion $C^+$ on the concentrations of the weak acid and strong base is obtained from Eq. (1) (n=0, m=1, $C_A$=0):

$$C^{+3} + (C_B + K_a)C^{+2} + (K_aC_B - K_aC_\alpha - K_aK_w) = 0 \quad (5)$$

The equations (4) and (5) form in this case a complete model of the system. Also in this case, the state of the system can be described by linear equations, but due to the presence of the weak compound the output relationship (5) is non-linear with regard to $C^+$.

The pH value indicating the acidity of the solution is measured by a suitable pair of electrodes followed by a linear amplifier. The voltage from the electrodes bears, on its part, a linear relation to the pH value of the solution which is a non-linear function of the hydrogen ion concentration.

$$pH = -\log_{10}[C^+/\text{mole/liter})] \quad (6)$$

SUMMARY OF THE INVENTION

The present invention provides a method of the character once described, wherein the improvement comprises the combination of following steps:

(a) transforming the result of the pH measurement to a concentration quantity, such as the hydrogen ion concentration, (b) transforming likewise the reference value given as a pH number to a concentration quantity, such as the hydrogen ion, (c) determining, by means of an equation describing dissociation equilibria in the solution, a final feedback quantity which, in addition to being a function of the concentration quantity in step (a), may be a function of an independent concentration quantity based on other measurement at the output part of the vessel, (d) determining, by means of said equation, a final reference value which, in addition to being a function of the concentration quantity in step (b), may be a function of the independent concentration quantity in step (c), (e) forming a control deviation as the difference of the final reference value in step (d) and of the final feedback quantity in step (c), and (f) controlling the feed of the controlling chemical on the basis of said control deviation, typically using a linear controller and an actuator controlled by it.

In a specific embodiment of the invention the concentration quantity in step (a) is the difference of the hydrogen ion concentration and hydroxyl ion concentration, the concentration quantity in step (b) is the difference of the corresponding hydrogen ion concentration and hydroxyl ion concentration, the final feedback quantity in step (c) is the difference of the hydrogen ion concentration and hydroxyl ion concentration in step (a) as such, and the final reference value in step (d) is the difference of the hydrogen ion concentration and hydroxyl ion concentration in step (b) as such.

DESCRIPTION OF THE METHOD

At each point of the process, pH, $C^+$ and $C = C^+ - C^-$ are unambiguous functions of each other. If only strong acids and bases are present, the last named variable in addition depends linearly on $C_B$ and $C_A$ and on their difference. The process in the liquid phase has been stated above linear for this case, both with regard to the chemical concentration and to the concentration difference C. One essential feature of the invention is, indeed, the use of the concentration difference C for control. Since the measurement of acidity in practice is favorable and handy to perform with a pH-meter, this accordingly indicates a calculation by which C is obtained from the result of measurement. In feedback control this quantity has, further on, to be compared with the set point and the difference of these quantities is brought to the controller which controls the feed of the controlling chemical.

It is characteristic to the earlier research reports on the feedback control of acidity and to the practical applications that pH ($pH_{ref}$) has been used as the set point of the closed loop, except for the stability studies at which no set point has been used. It is, however, possible to transform the said set point $pH_{ref}$ by computation to the corresponding C variable, and it is not until this variable which is brought to the comparator of the loop and operates thus as the set point of the closed loop. The inclusion of this transformation belongs to the essential features of the invention.

DESCRIPTION OF THE PREFERRED EMBODIMENT

Figure 1:
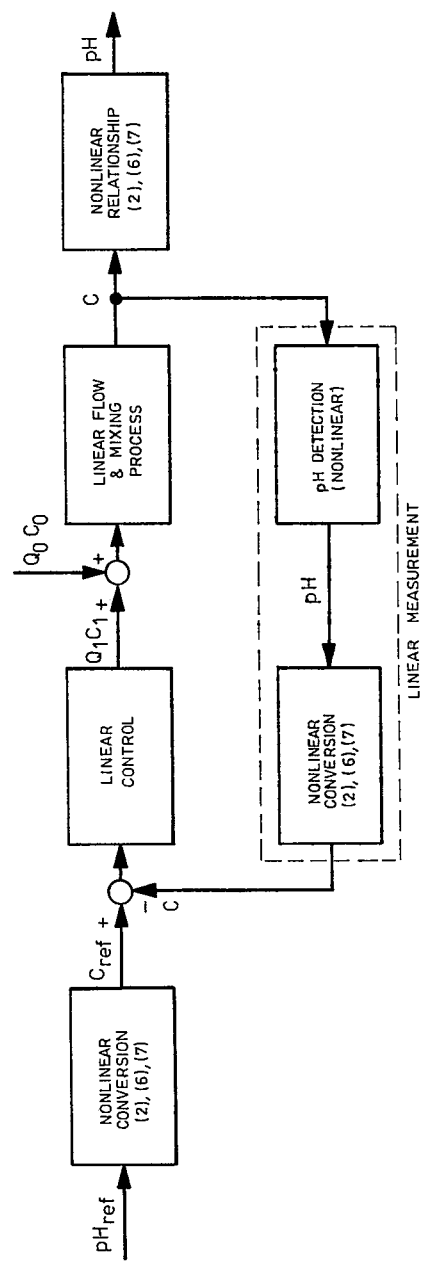

The enclosed figure shows the block diagram of a linear feedback control loop for controlling the pH in accordance with this invention. The linearity of the closed loop is a great practical advantage considering the tuning of the control, since the methods of tuning are generally known for linear control loops, while no simple or generally applicable methods exist for non-linear loops.

If the control flow $Q_1$ contains only strong acid (base), the condition of electric neutrality shows that $C_{A1} = C_1$ ($C_{B1} = -C_1$). A complete linearity would require the control of concentration of the chemical, but the control is sufficiently linear in practice also then, when the flow is controlled, if this is small in comparison with the process flow and its concentration correspondingly high. Then the control flow affects only little the flow characteristics of the process, $Q_{1s}C_1(t) \approx Q_1(t)C_{1s}$, where s prefers to the steady state.

The described linear control differs essentially from the conventional non-linear control in which the control deviation is formed as a difference of pH-valued quantities and brought subsequently to a linear controller. The block diagram presentation of such control loop is obtained from the presentation of FIG. 1, if the transformations of the primary, indirect set point of the measured pH in it are removed and the remaining pH quantities are brought directly to the comparator. It can be shown that at an application of the proportional control the gains are equal in both methods, if the deviations from the set point are small and if the gains of the controllers depend from each other according to Eq. (8).

$$C = C^+ - C^- \quad (7)$$

$$\frac{K_c}{K_{pH}} \approx -\frac{1}{\sqrt{C^2 + 4K_w \ln 10}} \quad (8)$$

If the control deviation is not small, the control methods differ considerably from each other. The total gain of the conventional control depends on the set point, and decreases generally strongly for an increasing control deviation. This kind of control is thus less efficient against large than small deviations which is unfavourable considering the control. Instead of that, the gain of the new, linear control method is a constant, independent of the set point. Correspondingly, the conventional control system which is stable in the presence of a large concentration disturbance of a long duration, may be unstable in the absence or at a small value of the disturbance. Phenomena of this kind are not present in linear control.

The advantage of the presented control method has been confirmed by experimental studies under controlled conditions in laboratory. The pH control was tested in a continuous flow vessel. The proportional controller was used for control, when the basic characteristics of control were best illustrated. Both control methods were tested separately, and the gain factors were made to correspond to each other in agreement with Eq. (8), so that in the presence of a very small disturbance the permanent deviations were equal. In a typical test the initial state of the system was: feed pH of process solution=3,5, feed pH of control solution=12.0, output pH corresponding to the equilibrium 7 and the controller gain about 1/10th of that at the stability limit. The system was subjected to a step disturbance of 0.02 pH unit in the incoming process solution which was of a not inconsiderable order of magnitude, due to the sensitivity of the process.

For the non-linear control, the permanent deviation rose to about 1.2 pH unit, while the loop gain simultaneously decreased to 33% of its value at a steady state. When the linear control was applied, the permanent deviation was about 0.8 pH unit. Despite the higher gain the stability of the system was well sufficient also in the latter case.

If the solution contains weak acids or bases, it is seen from Eq. (1) that no such unambiguous function of $C^+$ then exists which would depend linearly on the concentration of a single control chemical. Likewise the output relationship (5) of the example system shows that a sole pH measurement or a quantity obtained by a subsequent calculation is as such insufficient for an unambiguous description of the process state and so for the realization of an unambiguous control for the linear process. The common habit of controlling processes which are complex for their composition by means of one pH measurement and the feedback method is obviously one reason to difficulties met in the control of such processes.

The control of such system can be realized unambiguously by introduction of an additional independent measurement which may be based e.g. on a suitable ion selective pair of electrodes. If e.g. in the presence of a weak acid and a strong base $C^+$ and $C_B$ are measured, $C_a$ can be calculated by means of the output relationship (5) which is valid irrespective of the mixing characteristics. If alternatively $C^+$ and $C_a^-$ are measured, $C_B$ is obtained by means of Eqs. (3) and (5).

When the object of control is the acidity to which $C^+$ is related, and the control chemical is a strong base, the reference value of the latter depends also on the concentration of the weak acid present. Eq. (5) is used another time and $C_{ref}^+$ and the value of $C_a$ which has been measured or calculated in the presented manner are substituted in it, and the reference value $C_{Bref}$ is calculated from the equation. The difference $C_{Bref}-B$ is now brought as the control deviation to the controller controlling the control chemical, the strong base. Instead of a control deviation depending directly on the acidity, the controller is thus provided with an indirect control deviation the value of which is also affected by the weak acid present. If alternatively a weak acid would be used as the controlling chemical, the determination of the controlling control deviation would proceed analogously to what was presented above, applying Eq. (5).

The presented method can be applied as an approximation to the cases with more complex solutions than those above. This requires that the treated process solution can be described at the neighbourhood of the point of operation by a weak acid or based the dissociation constant K of which has been given a suitable value. If a strong acid or base is used for control, the control method presented above can be applied to this case.

Summarizing it is thus stated that in the presence of a weak acid or base and when one feed solution can be approximated by such one sufficiently accurately at the neighbourhood of the point of operation, the closed control loop is linear with regard to the control chemical, but that for determination of the reference value for this loop a relationship (5) is applied which is non-linear with regard to the $H^+$ ion concentration.

It is appropriate to emphasize that no fixed functional form has been assumed for the residence time distribution at the description of the method, but the treatment is valid for an arbitrary continuous flow vessel. If the residence time distribution is now known, the controller may be tuned by experiments, which is the general method in tuning of linear controllers for imperfectly known processes. Linearity of the process and control loop is a remarkable advantage also with regard to combined methods of control, since the presented feedback controls can be combined with control signals determined by independent methods, like by feedforward control, using either the same or a separate actuator.

The presented feedback control methods are easily implemented in practice using components which are available today. The pH meter and transmitter is an instrument which has reached an established industrial use. For the determination of the concentrations of other ions or of the total concentrations of acids and bases a plenty of measuring devices based on various principles are available of which especially the ion selective electrodes with their amplifiers are favourable due to their low price and easy applicability.

The result of the pH measurement and the value of the reference variable given by a pH number can be transformed to the corresponding concentration-valued quantity by means of devices of analog type, but also the real time microcomputer connected to the measuring devices is very suitable for this prupose; the transformation can naturally be made also in a bigger process computer. Likewise for the formation of the error signal and for the control task one can use a normal analog type controller, like the P-, PI- or PID-controller or such non-linear general purpose controller like e.g. so-called progressive Teleperm controller (registered trade mark) which is aimed to ameliorate the properties of the conventional linear controller through a gain factor which grows for an increasing control deviation. If a digital computer is used, it is naturally possible and favourable to implement in the computer also formation of the error variable and the control calculations needed for the control of the actuator.

What is claimed is:

1. In a method for controlling pH in a continuous flow vessel which is entered by a process material through a feed channel and by controlling chemical solution through a control channel and in which the pH is measured at the output part of the vessel in order to effect the control by controlling the feed of the control chemical by the feedback method, the value of a reference variable being given and expressed by a pH number, a combination of steps which comprises:

(a) transforming the result of the pH measurement to the hydrogen ion concentration, (b) transforming likewise the reference value given as a pH number to the corresponding hydrogen ion concentration, (c) determining, by means of an equation describing dissociation equilibria in the solution, a final feedback quantity which is a function of the concentration quantity in step (a), (d) determining, by means of said equation, a final reference value which is a function of the concentration quantity in step (b), (e) forming a control deviation as the difference of the final reference value in step (d) and of the final feedback quantity in step (c), and (f) controlling the feed of the controlling chemical on the basis of said control deviation, typically using a linear controller and an actuator controlled thereby.

2. A method according to claim 1, wherein the final feedback quantity of step (c) and the final reference value of step (d), which are functions of the hydrogen ion concentration of step (a) and step (b), respectively, are also functions of an independent concentration quantity based on other measurement at the output end of the vessel.

3. In a method for controlling pH in a continuous flow vessel which is entered by a process material through a feed channel and by controlling chemical solution through a control channel and in which the pH is measured at the output part of the vessel in order to effect the control by controlling the feed of the control chemical by the feedback method, the value of a reference variable being given and expressed by a pH number, a combination of steps which comprises:

(a) forming a final feedback quantity by transforming the result of the pH measurement to the difference between the hydrogen ion concentration and hydroxyl ion concentration, (b) transforming likewise the reference value given as a pH number to the difference between the corresponding hydrogen ion concentration and the hydroxyl ion concentration, (c) forming a control deviation as the difference of the transformed reference value in step (b) and of the transformed final feedback quantity in step (a) and (d) controlling the feed of the controlling chemical on the basis of said control deviation, typically using a linear controller and an actuator controlled thereby.

4. Apparatus for controlling pH in a continuous flow vessel which is entered by a process material through a feed channel and by controlling chemical solution through a control channel and wherein the pH is measured at the output part of the vessel in order to effect the control by controlling the feed of the control chemical by the feedback method, the value of a reference variable being given and expressed by a pH number, said apparatus comprising:

means for transforming the result of the pH measurement to the hydrogen ion concentration in said vessel;

means for transforming the reference value given as a pH number to the corresponding hydrogen ion concentration;

means for determining, by means of an equation describing dissociation equilibria in the solution, a final feedback quantity which is a function of the concentration quantity transformed from said pH measurement;

means for determining, by means of said equation, a final reference value which is a function of the concentration quantity transformed from said reference value;

means for forming a controlled deviation as the difference of said final reference value and said final feedback quantity; and means for controlling the feed of the controlling chemical as a function of said control deviation, said last-mentioned means including a linear controller and an actuator controlled thereby.

5. Apparatus for controlling the pH in a continuous flow vessel which is entered by a process material through a feed channel and by controlling chemical solution through a control channel and in which the pH is measured at the output part of the vessel in order to effect the control by controlling the feed of the control chemical by the feedback method, the value of a reference variable being given and expressed by a pH number, said apparatus comprising:

means for forming a final feedback quantity by transforming the result of the pH measurement to the difference between the hydrogen ion concentration and hydroxyl ion concentration in said vessel;

means for transforming the reference value given as a pH number to the difference between the corresponding hydrogen ion concentration and the hydroxyl ion concentration;

means for forming a control deviation as to difference of said transformed reference value and said transformed final feedback quantity; and means for controlling the feed of the controlling chemical on the basis of said control deviation, said last-mentioned means including a linear controller and an actuator controlled thereby.

* * * * *